UNITED STATES PATENT OFFICE.

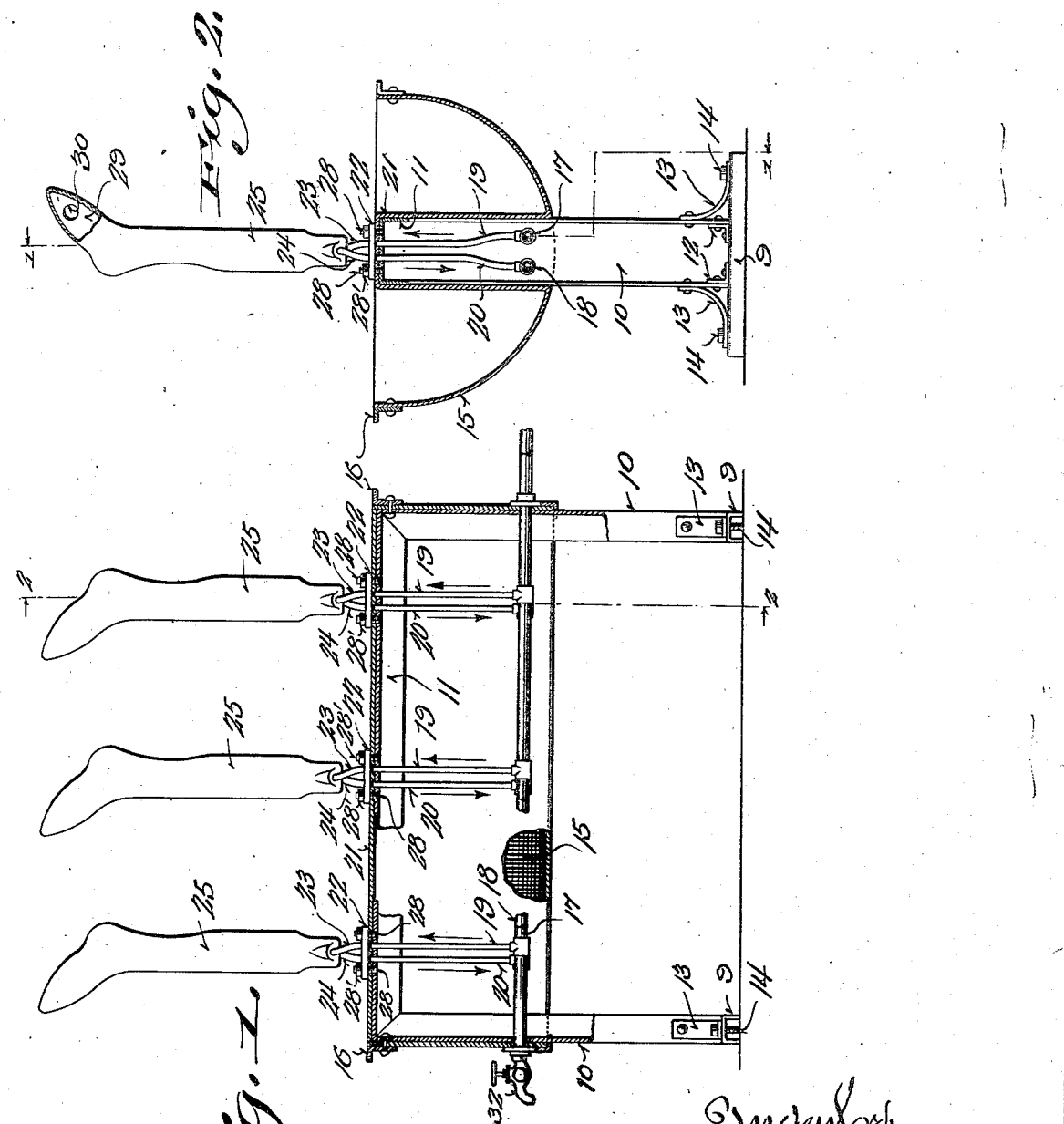

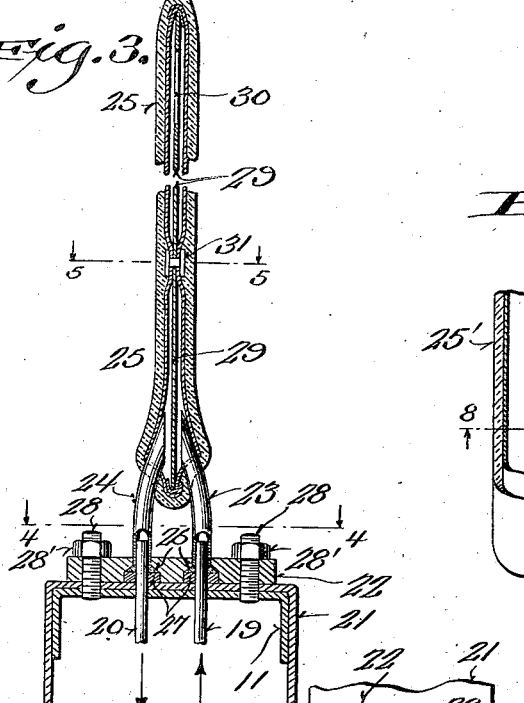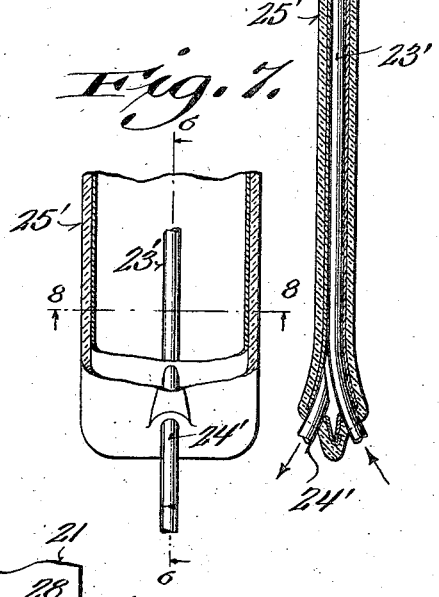

EBY R. APPLIN, OF WAUPUN, WISCONSIN.

STOCKING DRYING AND SHAPING APPARATUS.

1,192,151.  Specification of Letters Patent.  Patented July 25, 1916.

Application filed May 3, 1915. Serial No. 25,360.

*To all whom it may concern:*

Be it known that I, EBY R. APPLIN, a citizen of the United States, and resident of Waupun, in the county of Dodge and State of Wisconsin, have invented certain new and useful Improvements in Stocking Drying and Shaping Apparatus; and I do hereby declare that the following is a full, clear, and exact description thereof.

My invention relates to stocking drying and shaping forms generally similar to the one set forth in Letters Patent No. 1,103,245, issued to me July 14, 1914, said invention consisting in what is herein particularly set forth with reference to the accompanying drawings and pointed out in the claims of this specification, its object being to improve the form with respect to its connection with a suitable support and with a heating-fluid circulating system, the support being preferably an especially constructed stand having a twin trough associated therewith as is herein shown and described.

Figure 1 of the drawings represents a partly sectional elevation of said stand and trough, a series of stocking drying and shaping forms, and means in accordance with my invention by which the forms are connected to the stand and to pipe-branches of a heating-fluid circulating system, the view being generally indicated by line 1—1 in the next described illustration. Fig. 2, a cross-section indicated by line 2—2 in Fig. 1, the stocking drying form and parts therewith in this view being in elevation, and said form partly broken away at its toe-end; Fig. 3, a sectional view illustrating one of the forms and its connections with a trough-supporting stand and branch-pipes of a heating-fluid circulating system, the plane of the section being indicated by line 3—3 in the next described illustration; Fig. 4, a detail plan view partly in horizontal section on the plane indicated by line 4—4 in Fig. 3; Fig. 5, a horizontal section indicated by line 5—5 in Fig. 3; Fig. 6, a sectional view indicated by line 6—6 in Fig. 7, and illustrating an extension of a nozzle in a non-partitioned stocking drying and shaping form; Fig. 7, an elevation partly in section of a fragment of what is shown in Fig. 6, and Fig. 8, a horizontal sectional view on the plane indicated by line 8—8 in Fig. 7.

Referring by numerals to the drawings, 9 indicates each of a pair of channel-iron feet, 10 each of a pair of channel-iron legs and 11 a channel-iron top of a stand, said legs and top being a single piece of the same material suitably cut and bent. Stay-brackets 12 and 13 are fastened to the feet and legs of the stand by rivets and bolts, and the bolts 14 may serve to fasten said stand on a floor. It is preferred to employ a twin-trough 15 in connection with the stand astraddle of the top of the same, and a stiffening-frame 16 is employed in connection with the stand.

Horizontally disposed supply and return pipes 17, 18, respectively, of a steam or hot water circulating system are shown in connection with the stand and trough. Vertical branches 19 of the pipe 17 and similar branches 20 of the pipe 18 extend through the top of the stand and the horizontal web 21 of the trough thereon. Bolted on said web of the trough, or on the top of the stand, in the absence of said trough, are base-plates 22 each having stuffing-box union with the pipe-branches 19, 20. The pipe branch 19 engages a nozzle 23, and the pipe-branch 20 engages a nozzle 24. Both nozzles extend into a hollow body constituting a stocking drying and shaping form 25 with which they have fluid-tight connection, and said nozzles are rigid in the adjacent base. The nozzles are molded in the base and said base reamed out from its underside to provide for seating socket for a conical packing-gasket 26 and an underlying retaining washer 27 for the same, the washers being normally extended slightly below the lower face of the base plate, whereby a tight coupling joint is effected when the parts are attached. The base is bored for the passage of securing bolts 28 having nuts 28' thereon, and it is preferable to have the nozzles and bolt-holes alined diagonally of a base, as is shown in Fig. 4, said base being of any suitable metal or metallic composition. The length of the stand and trough therewith may be indefinitely varied and the bases 22 are fastened thereon at suitable intervals apart.

In Fig. 3, is shown a stocking drying and shaping form 25 pierced with nozzles 23, 24, on opposite sides of a partition 29, which partition divides said form into two compartments having communication through a port 30 in the upper end of said partition. Were the partition devoid of a port and terminated short of the toe-end of the form, the same result would be accomplished without departure from my invention as claimed. The partition serves to stiffen the form, and it is preferable to indent the sides of the form-lining and rivet the indentations against said partition as is shown at 31 in Figs. 3 and 5, whereby said form is further stiffened.

From the foregoing it will be understood that the heating-fluid enters a form 25 through a nozzle 23, and rising in one compartment of said form it finds its way into the other compartment thereof to discharge through a nozzle 24.

As shown in Fig. 6, a form 25′ without a partition as aforesaid may be employed and have the nozzle 23′ therewith extend up to nearly the toe-end thereof. This variation of construction provides for the discharge of heating fluid high up in the form from which it escapes through the shorter nozzle 24′. The main supply and return pipes of the heating-fluid circulating system are each preferably provided with a drain-cock, and one of the cocks is shown at 32 in Fig. 1. The trough aforesaid is for damp stockings and a portion of the same may be provided with a removable shelf upon which to lay stockings taken from the adjacent forms.

I claim:

1. A drying and shaping apparatus comprising a frame, a pair of troughs carried at the sides of the frame, a table member connecting the inner edges of the troughs, form members carried on the table, steam pipes extended between the troughs and lateral extensions connected with said pipes and extending through the table to the form members.

2. A drying and shaping apparatus comprising a strip of metal bent in substantially inverted U-shape, twin troughs formed of a sheet of metal bent downwardly about the bight portion of the said strip, with its ends bent upwardly, end plates closing the ends of the troughs, the bight portion of the U-shape member and the adjacent trough sheet portion forming a table, form members carried on the table and steam pipes extending into the space between the troughs and connected to the form members.

3. In a shaping and drying apparatus, the combination with a table member having steam pipes extended therethrough, of a form member, steam pipes extended from the form member and telescopically receiving the steam pipes of the table, a securing plate carried by the ends of the form pipes and countersunk adjacent said ends, washers in said countersinks adapted to surround the steam pipes of the table and means for clamping the plate to the table.

4. In a drying and shaping apparatus, a form member comprising a plate having substantially the outline shape of the work article, a pair of plates at the sides of the first mentioned plate and having their edges bent therearound, with their body portions spaced therefrom, the first plate having an opening therein adjacent one end of the form and pipes carried at the other end of the form and communicating with the passages formed by the outer plates.

In testimony that I claim the foregoing I have hereunto set my hand at city of Waupun, in the county of Dodge and State of Wisconsin, in the presence of two witnesses.

EBY R. APPLIN.

Witnesses:
R. D. TILLOTSON,
E. A. TILLOTSON.